Figure 1:
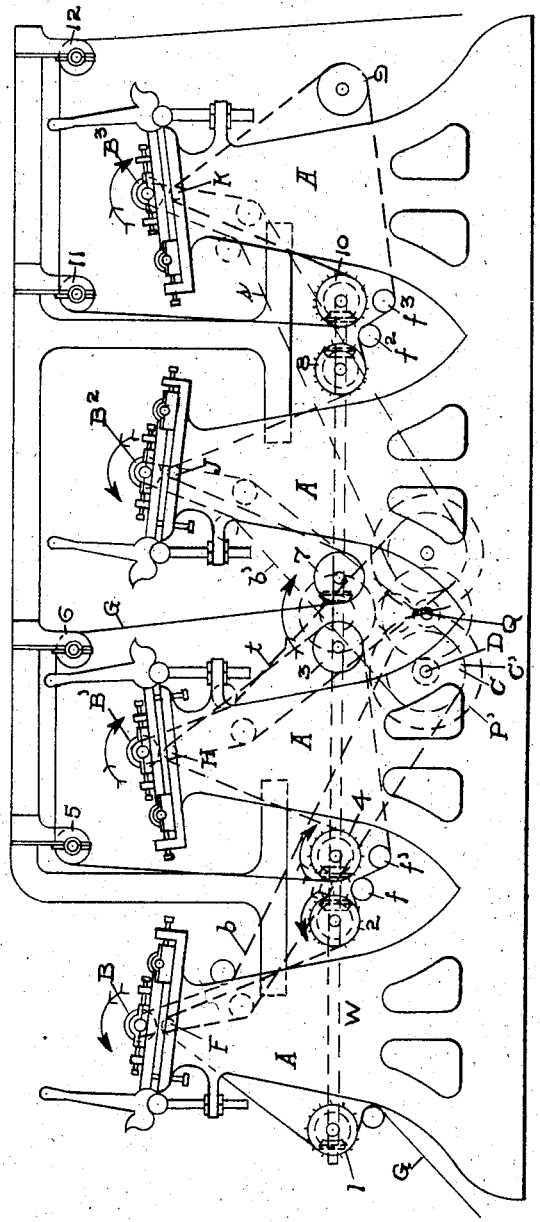

No. 772,437. PATENTED OCT. 18, 1904.
F. E. SMITH.
MACHINE FOR SHEARING RUGS.
APPLICATION FILED NOV. 18, 1902.

NO MODEL. 2 SHEETS—SHEET 1.

WITNESSES
Dudley B. Wade
Lottie Prior

INVENTOR
Frederick E. Smith,
BY Ward Cameron,
Attorneys

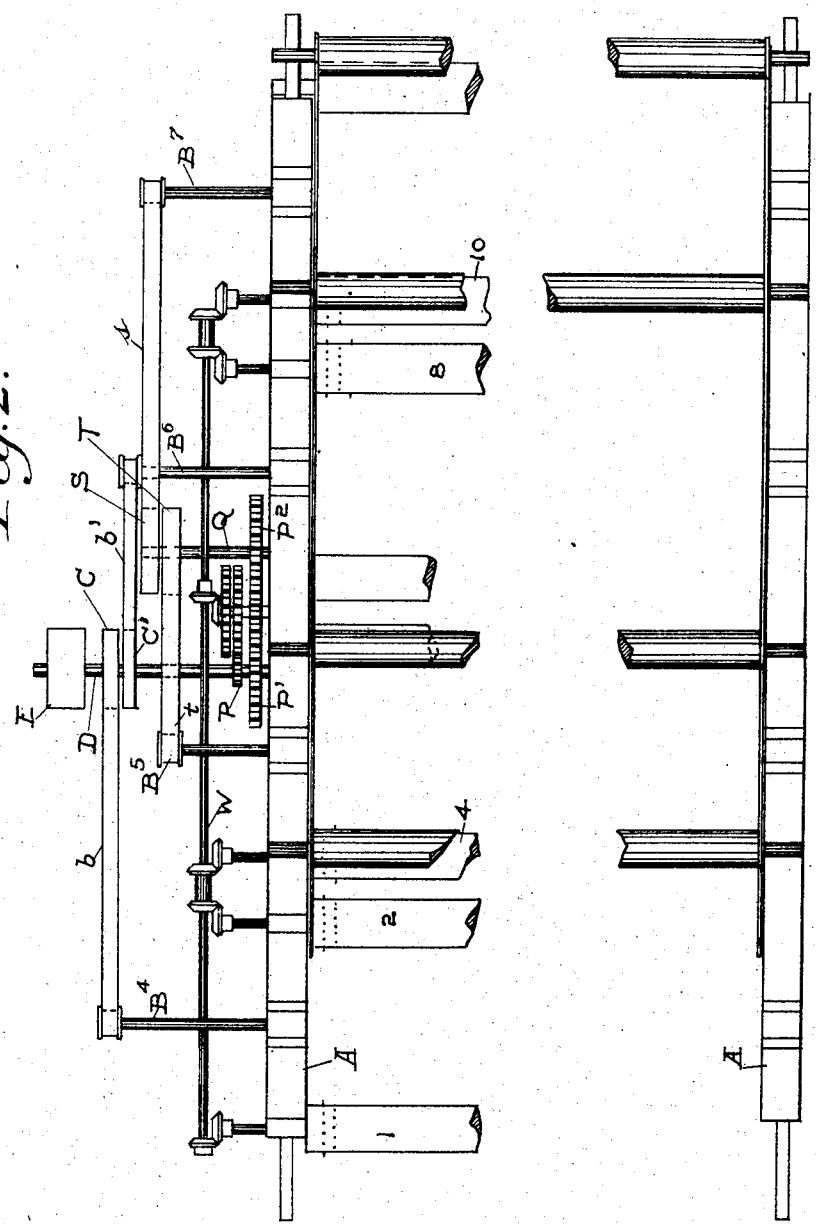

No. 772,437.

Patented October 18, 1904.

UNITED STATES PATENT OFFICE.

FREDERICK E. SMITH, OF AMSTERDAM, NEW YORK.

MACHINE FOR SHEARING RUGS.

SPECIFICATION forming part of Letters Patent No. 772,437, dated October 18, 1904.

Application filed November 18, 1902. Serial No. 131,830. (No model.)

*To all whom it may concern:*

Be it known that I, FREDERICK E. SMITH, a citizen of the United States of America, and a resident of the city of Amsterdam, county of Montgomery, and State of New York, have invented certain new and useful Improvements in Machines for Shearing Rugs, of which the following is a specification.

My invention relates to improvements in machines for making carpets and rugs.

The object of my invention is to provide a machine whereby both faces of the carpet or rug may be sheared without its removal from the machine. I attain this object by means of the mechanism illustrated in the accompanying drawings, in which—

Figure 1 is a side elevation. Fig. 2 is a plan with parts broken away.

Similar letters and figures refer to similar parts throughout both views.

After the carpet or rug has been woven it is necessary to cut the threads and protruding ends of material which extend in uneven lengths from each side of the carpet, and for this purpose it has been the custom to run it through a cutting or shearing machine, which will shear off one side, and then reverse the carpet and run it through the machine, which will cut the other side, and then pass it on to a second machine or to the same machine regulated to shear closer to the woof or body of the carpet, where the process is again repeated. Considerable time and labor are thus consumed in handling the carpet during the operation of shearing the same.

In order to expedite the shearing, I have provided a machine which will automatically carry the carpet through the same, providing for cutting each side of the carpet in the same manner and with equal accuracy as when the operation is performed in the way first above described. In order to accomplish this improved method of shearing carpet, I use substantially the same cutter or shearer as is now employed, and I therefore do not illustrate, nor do I intend to describe in any degree of particularity, the means employed for cutting the threads and projecting portions of the material, simply referring to the cutter in a general way.

On suitable supports A, I mount a revolving cutter B, arranged to revolve in the direction shown by the arrow at the left of Fig. 1 by means of the belt $b$, mounted on a pulley C, which is secured to the shaft D, operated by the drive-pulley E. The carpet G is placed over a bar F and is operated upon by the cutter B. The carpet is fed by means of the spiked roller 1 and the spiked roller 2, which rollers revolve in opposite directions, the first being at the left of the bar F and the second at the right thereof. The movement of the rollers being in opposite directions, it is apparent that they will tend to draw the carpet over the bar F, and therefore in contact with the cutting-blade B. After passing in contact with the roller 2 the carpet passes over the loose rollers $f f'$, respectively, and in contact with the roller 3, which rotates in the same direction as the roller 2 and about which the carpet passes and is carried to the bar H, where the carpet comes in contact with the cutter B', similar to the cutter B. It is now the opposite side of the carpet which comes in contact with the cutter B' from that which engaged with the cutter B. Therefore the opposite side of the carpet is sheared. After leaving the cutter B' the carpet passes round the spiked roller 4, which tends to draw the carpet forward away from the cutter, revolving, as it does, in a direction opposite to that of roller 3. From roller 4 the carpet is carried upward away from the machine over rollers 5 and 6 and conducted to the roller 7, from whence it passes to the cutter $B^2$, passing over the bar J, where the carpet is again sheared on the side which first was acted upon by the cutter B. After leaving the cutter $B^2$ the carpet passes round the spiked roller 8, loose rollers $f^2$ $f^3$ to roller 9, thence to bar K and cutter $B^3$, where the carpet is cut on its reverse side a second time. From thence the carpet is taken to spiked roller 10, roller 11, suspended above the machine, and roller 12, so suspended, from whence the carpet is taken away thoroughly sheared on both sides and without having been removed by hand from the machine since it started.

It is apparent that the direction of revolution of the cutters will differ, depending upon the side of the machine from which the carpet is fed through the cutters. Thus cutter B revolves in the direction shown by the arrow from right to left, while the cutter B' revolves in the opposite direction. The cutter $B^2$ rotates in the same direction as does cutter B, while the cutter $B^3$ revolves in the same direction as the cutter B'. In order to provide for these different directions of motion, I connect the pulley C on the shaft D by means of the belt $b$ to the axle $B^4$, carrying the cutter B, as already described. I also arrange on said shaft D a similar pulley C', which I connect by belt $b'$ to the axle $B^6$, carrying the cutter $B^2$, both of these cutters B and $B^2$ thus being operated in the same direction. On the axle D, I arrange a wheel P', which meshes with the wheel $P^2$ on shaft Q, carrying the pulleys S and T. Pulley S is connected by belt $s$ to the axle $B^7$, carrying the cutter $B^3$, while pulley T is connected by the belt $t$ to the axle $B^5$, carrying the cutter B'. Cutters B' and $B^3$ revolve in the same direction.

For the purpose of arranging for the movement of the rollers carrying the carpet during its progress I place a shaft W, preferably in a horizontal position, provided with a series of beveled gears arranged to engage with the beveled gears on the ends of the rollers 1, 2, 4, 8, and 10. In this way I provide for causing the rollers 1, 4, and 10 to revolve in the same direction, because of the bevel-gears on the rod W engaging with the bevel-gears on the rods carrying said rollers on the same side, while the rollers 2 and 8 revolve in the opposite direction, for the reason that the bevel-gears on the shaft W engage with the opposite side of the bevel-gears on the said last-mentioned rollers. As is shown in the horizontal section in Fig. 2, the rollers extend across the machine, having suitable bearings in the frame A.

I do not wish to limit myself to the means described and illustrated for conveying motion to the rollers and cutters, since any convenient means may be employed for accomplishing this result, that which is herein described being the one preferably used for that purpose.

It is sometimes found necessary to give a carpet or rug a second shearing. Hence to obviate running it through by removing it the last cutter of my machine finishes it, thus avoiding the time and labor of removing the same. Some carpets or rugs require shearing slightly on the wrong side only once, while the opposite side needs a second application. This may be arranged for in my machine by throwing the last cutter out of gear, and thus completely finishing the work as it leaves the machine.

What I claim as my invention, and desire to secure by Letters Patent, is—

1. In a machine for shearing rugs, the combination of a series of cutters, guiding means for conducting the rug past the under side of all the cutters and guiding means for conducting the rug over but remote from one or more of the cutters whereby opposite sides of the rug are presented to the cutters; substantially as described.

2. In a machine for shearing rugs the combination of a pair of rotary cutters means for guiding the rug to the under side of both said cutters in opposite directions and guiding means for conducting the rug over but remote from one of the cutters whereby opposite sides of the rug are presented to the succeeding cutters; substantially as described.

3. In a machine for shearing rugs the combination of the following instrumentalities to wit: a pair of parallel rotary cutters, means for guiding and feeding the rug to the under side of both cutters but in opposite directions and means for guiding the rug from one cutter to the other whereby both sides of the rug are sheared; substantially as described.

4. In a machine for shearing rugs, the combination of the following instrumentalities, to wit: a series of parallel rotary cutters, means for guiding the rug to the under sides of all the cutters and means for conducting the rug from each cutter to the opposite side of the next succeeding cutter whereby the cutters shear opposite faces of the rug; substantially as described.

5. In a machine for shearing rugs, &c., the combination of the following instrumentalities, to wit: a plurality of parallel rotary cutters, means for rotating the cutters in opposite directions, means for guiding the rug beneath all of the cutters while being acted on thereby and means for guiding the rug from one side of one cutter to the opposite side of the next succeeding cutter; substantially as described.

Signed at Amsterdam, New York, this 1st day of November, 1902.

FREDERICK E. SMITH.

Witnesses:
LOUIS E. GUERTIN,
WM. WILLIAMSON.